United States Patent
Kumar et al.

(10) Patent No.: US 10,104,178 B2
(45) Date of Patent: Oct. 16, 2018

(54) SYSTEM FOR MANAGING COMMUNICATIONS ACTIVATED BY A TRIGGER EVENT

(71) Applicant: Genesys Telecommunications Laboratories, Inc., Daly City, CA (US)

(72) Inventors: Rajiv S. Kumar, Sugar Land, TX (US); Herbert Ristock, Walnut Creek, CA (US)

(*) Notice: Subject to any disclaimer, the term of this patent is extended or adjusted under 35 U.S.C. 154(b) by 369 days.

(21) Appl. No.: 14/288,359

(22) Filed: May 27, 2014

(65) Prior Publication Data

US 2015/0350331 A1    Dec. 3, 2015

(51) Int. Cl.
*G06F 15/16*   (2006.01)
*H04L 29/08*   (2006.01)
*H04M 7/00*    (2006.01)

(52) U.S. Cl.
CPC .......... *H04L 67/141* (2013.01); *H04L 67/04* (2013.01); *H04L 67/10* (2013.01); *H04M 7/0024* (2013.01); *H04M 2203/2094* (2013.01); *H04M 2250/22* (2013.01)

(58) Field of Classification Search
CPC ....... H04L 67/141; H04L 67/04; H04L 67/10; H04M 7/0024; H04M 2203/2094; H04M 2250/22
See application file for complete search history.

(56) References Cited

U.S. PATENT DOCUMENTS

| | | | | |
|---|---|---|---|---|
| 2003/0220835 A1* | 11/2003 | Barnes, Jr. | ......... | G06Q 10/1053 705/14.36 |
| 2004/0015559 A1* | 1/2004 | Goldstein | ........... | H04L 41/5061 709/217 |
| 2004/0183675 A1* | 9/2004 | Harris | .................... | G01D 9/005 340/539.13 |
| 2006/0190344 A1* | 8/2006 | Sang | ...................... | G06Q 30/06 706/50 |
| 2008/0255946 A1* | 10/2008 | Altberg | ................ | G06Q 20/102 705/14.55 |
| 2011/0063138 A1* | 3/2011 | Berkobin | ............... | G08G 1/207 340/988 |
| 2013/0157729 A1 | 6/2013 | Tabe | | |
| 2013/0227651 A1* | 8/2013 | Schultz | .................. | G06F 21/32 726/4 |
| 2014/0025767 A1* | 1/2014 | De Kezel | ............. | G06Q 10/107 709/206 |
| 2014/0051946 A1 | 2/2014 | Arne et al. | | |
| 2014/0143064 A1 | 5/2014 | Tran | | |

(Continued)

OTHER PUBLICATIONS

Ribeiro, John, *Google Glass not to allow face recognition for now, Google said it first had to provide strong privacy protections*, IDG News Service, Network World, Inc., Jun. 3, 2013, 2 pages.

(Continued)

*Primary Examiner* — Jonathan A Bui (57) ABSTRACT

A system including: a processor; and memory, the memory storing instructions that, when executed by the processor, cause the processor to: receive a request received over a network link, the network link being established between the system and a wearable computing device, the request comprising data corresponding to an event detected by the wearable computing device; and route the request to a resource in accordance with the data of the request.

17 Claims, 4 Drawing Sheets

(56) References Cited

U.S. PATENT DOCUMENTS

| | | | | |
|---|---|---|---|---|
| 2014/0307040 | A1* | 10/2014 | Choi | H04W 4/046 348/14.01 |
| 2015/0121528 | A1* | 4/2015 | Crowley | H04L 63/1441 726/23 |
| 2015/0213455 | A1* | 7/2015 | Snellings | G06Q 30/016 705/304 |
| 2015/0312394 | A1* | 10/2015 | Mirza | H04M 1/7253 455/420 |
| 2016/0036977 | A1* | 2/2016 | Chan | H04M 3/5232 379/265.1 |
| 2016/0057595 | A1* | 2/2016 | Ahmed | H04W 4/22 455/404.1 |
| 2016/0174626 | A1* | 6/2016 | Mazzarolo | A41D 13/018 2/455 |
| 2017/0281081 | A1* | 10/2017 | Nousiainen | A61B 5/681 |

OTHER PUBLICATIONS

International Search Report and the Written Opinion for PCT/US2015/032729, dated Jul. 8, 2015, 15 pages.

Sacco, Al, *'Salesforce Wear:' A Wearable Tech Toolset for the Enterprise*, Mobile and Wireless for CIO.com, Jun. 10, 2014, 3 pages.

Swinhoe, Dan, *Are Enterprises Ready for Wearables?*, IDG Connect, Nov. 24, 2014, 3 pages.

\* cited by examiner

SYSTEM FOR MANAGING COMMUNICATIONS ACTIVATED BY A TRIGGER EVENT

BACKGROUND

1. Field

Aspects of embodiments of the present invention relate to the field of network communications between a call center and individuals, including call center agents.

2. Related Art

In the field of network communications, businesses now have multiple options for communicating with clientele. These options may include communicating with clients over an Internet-based network connection established between a client device and a business resource having connection to the network.

With the advent of wearable computing and communications appliances, interaction with business resources can be accomplished hands-free and from any convenient location having Internet connectivity. Wearable communications appliances vary widely in features and capabilities. More recently, wearable communications appliances have been provided that include computing features such as data processing of user input and capabilities like provision of digital display functionality in an area that is convenient for the wearer of the appliance, such as onboard a pair of network connected computing glasses, a wrist mounted computing device, a clip-on computing device (such as a necklace).

Users operating wearable communications appliances still must undergo considerable work in the form of communications tasks required to communicate with network-connected third-party resources such as a call center for example. These tasks may include entity selection followed by execution of a live communications request, selecting communications modes such as text or voice, inputting message body or voice mail content, searching contacts, and so on.

SUMMARY

According to one embodiment of the present invention, an apparatus includes: a wearable enclosure; a user interface in the wearable enclosure; a sensor in the wearable enclosure; a network interface in the wearable enclosure; a processor in the wearable enclosure and coupled to the user interface, the sensor, and the network interface; and a memory in the wearable enclosure and coupled to the processor, the memory storing instructions that, when executed by the processor, cause the processor to: detect an event using input data generated by the sensor; establish a network link between a call center and the apparatus using the network interface; transmit a request over the network link, the request being triggered by the event; and receive a response to the request from a resource, the response being based on the nature of the documented event.

The network link may be a wireless link.

The user interface may include a voice controlled interface.

The user interface may include a display.

The sensor may include an optical recognition module, and the event may be detected by analyzing the input data from the optical recognition module.

The request may include information corresponding to the input data associated with the event.

The sensor may include one or more bio-sensors, and wherein the event may be detected based on data from the one or more bio-sensors.

The sensor may include a microphone, and the event may be detected based on recognizing a pattern in audio data generated by the microphone.

According to one embodiment of the present invention, a system includes: a processor; and memory, the memory storing instructions that, when executed by the processor, cause the processor to: receive a request received over a network link, the network link being established between the system and a wearable computing device, the request including data corresponding to an event detected by the wearable computing device; and route the request to a resource in accordance with the data of the request.

The event may include an availability status associated with a user of the wearable computing device and the request may include the availability status, and the request may be routed to a repository configured to store the availability status of the user in accordance with the availability status of the request.

According to one embodiment of the present invention, a method includes: recording, using a wearable communications appliance including: a microprocessor, a sensor, and a user interface, sensor data collected by the sensor; comparing, using the microprocessor, the sensor data against one or more rules; triggering, using the microprocessor, an event if the sensor data satisfies at least one of the rules; generating, by the microprocessor, a request to a node connected to the network; and sending the request to the resource.

The network may be the Internet and the node may be a router.

The user interface may include a display.

The sensor data may include audio activity, visual activity, location, velocity, time of activity, or environmental data.

The audio activity may be recorded via a microphone coupled to the wearable communications appliance and the visual activity may be recorded using a camera coupled to the wearable communications appliance.

The triggering the event may cause the microprocessor to generate and to send the request, and the request may include data corresponding to the sensor data corresponding to the event.

The sensor may include one or more biosensors.

The sensor may include a voice recognition module.

The request may include a message request.

The request may include a recoded voice request.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to a system and method for establishing and maintaining a network link between a call center and users operating wearable communications appliances. The system is capable of receiving requests sent from the appliances, the requests being triggered by an event occurring or that has occurred in the proximity of users (e.g., the users of the appliances), and routing the requests to resources available to the call center.

Figure 1:
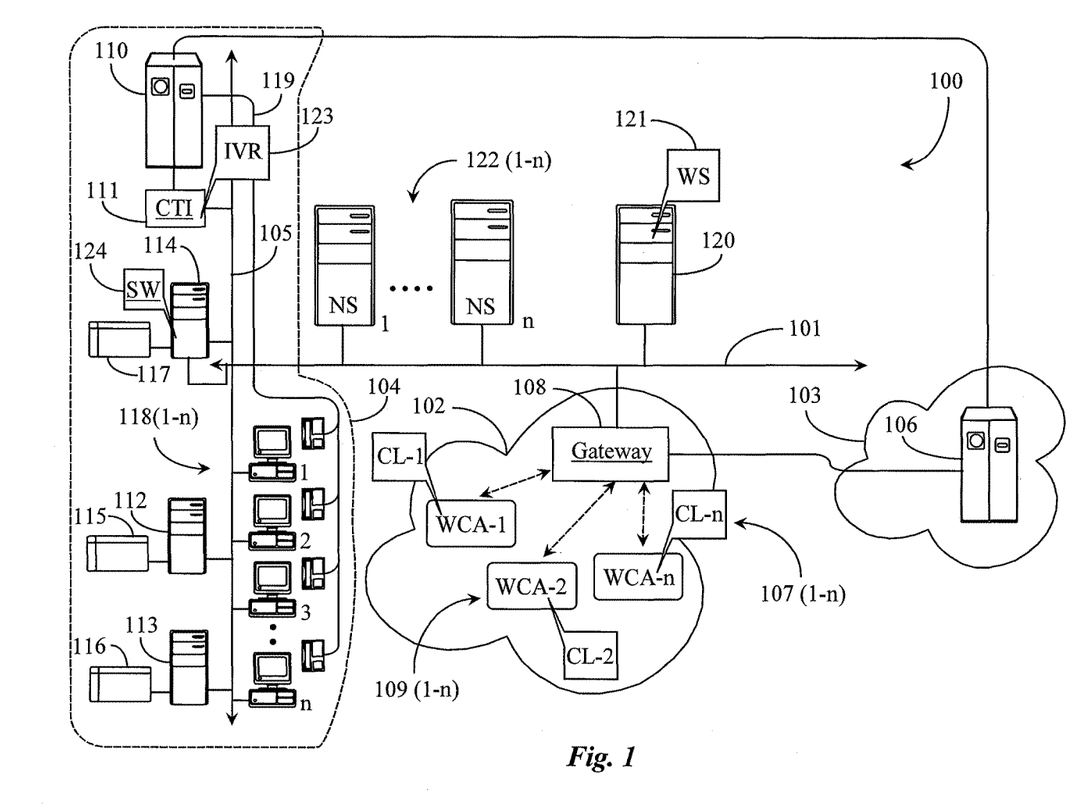
FIG. 1 is an architectural overview of a communications network supporting active communications based on trigger events according to one embodiment of the present invention.

FIG. 1 is a schematic architectural overview of a communications network 100 supporting active communications based on trigger events according to one embodiment of the present invention. Network 100 may include a connection to the Internet network, as illustrated herein by a network backbone 101. Network backbone 101 may represent all of the lines, equipment, and access point that make up the Internet network as a whole including any connected sub-networks. Therefore, there are no geographic limitations to the practice of the present invention. Network 101 may be, for example, a wide area network (WAN), a local area network (LAN), a virtual private network (VPN), without departing from the spirit and scope of the present invention.

Network 101 may be accessed, for example, through a wireless carrier network 102. Wireless network 102 may be a digital cellular network, or another wireless carrier network having connection to network 101. Wireless network 102 may include a wireless gateway 108 bridging network communications between the carrier network and the Internet. Gateway 108 may be associated with a wireless Internet service provider (ISP). Gateway 108 may represent any communication gateway that supports data communications (e.g., gateway 108 may also support voice communications).

Gateway 108 may have a telephony connection to a telephone switch 106 in telephone network 103. Network 103 may be the public switched telephone network (PSTN). Telephone switch 106 may be an automated call distributor or a private branch exchange without departing from the spirit and scope of the present invention.

Communications network 100 may include a call center 104. Call center 104 may represent any business or collection thereof that hosts or contracts for contact center communications services. Such services may include sales of products and services to users or clients. Wireless Communications Appliances (WCA) 109 (1-n) represent, in one embodiment, wearable computing appliances capable of accessing and using the communications network that may be operated by various users. WCAs 109 (1-n) may access network 101 through gateway 108. WCAs 109 (1-n) may vary in communications and computing capabilities without departing from the spirit and scope of the invention. Wearable computing appliances may include computing devices in a variety of form factors including, for example, communications headsets, appliances worn as or with clothing, smart watches, earpieces, goggles, glasses, and so on.

In one embodiment of the invention, WCAs be wearable computing appliances that include a microprocessor (or processor) and a user interface with at least one input function, where the microprocessor and user interface are housed or enclosed in a wearable enclosure. For example, the wearable enclosure may be a pair of glasses, a wristwatch, a necklace, an armband, or other device that can be worn on a body. WCAs may be worn by or otherwise held in proximity of and operated by a user. WCAs 109 (1-n) may include capabilities of wireless voice communication and wireless data communication. In one embodiment, WCAs include displays (e.g., a liquid crystal display (LCD) or an organic light emitting diode (OLED) display) capable of displaying web pages, documents, and graphics including photos and video. In one embodiment WCAs include capabilities for network navigation.

Contact center 104 may include a local area network (LAN) 105. The LAN 105 has connection to network 101 through a router 114, which may have both a LAN connection and an Internet connection. Router 114 may include a processor, one or more data storage devices coupled thereto, and memory adapted to store data and instructions for operating as a data and media router according to one embodiment of the invention.

Contact center 104 includes a telephone switch 110. Telephone switch 110 may be a private branch exchange (PBX), an automatic call distributor (ACD), or another type of telephony switch. Telephone switch 110 of the contact center 104 is connected to telephone switch 106 of network 103 via a telephone trunk. Contact center 104 also includes agent workstations 118 (1-n), which are typically manned by live (or human) agents. Agent stations 118 (1-n) may include LAN connected computers and voice communications apparatuses such as telephones in this example. The voice communications apparatus associated at each agent station 118 (1-n) may be connected via internal telephony wiring to telephone switch 110.

Telephone switch 110 may also be enhanced for function via computer telephony integration (CTI) processor 111. CTI processor 111 may be connected to LAN 105 as shown in this example. CTI processor may provide intelligence to telephone switch 110 including access to interactive voice response (IVR) capability via an IVR application 123.

LAN 105 may support a server 112 coupled to a data repository (e.g., a database) 115. Server 112 may be an email or message server, an application server for IVR functions or some other server 112. Server 112 includes a processor and memory adapted to store data and instructions to enable function as a message or application server. LAN 105 may support a chat server 113 coupled to a data repository (or database) 116. Chat server 113 includes a processor and memory storing data and instructions to enable the chat server 113 to function as a chat server. Servers 112 and 113 are examples of resources that are internally available to call center 104.

Network 101 supports a web server 120. Web server 120 includes a processor, a data storage device, and a memory storing data and instructions for the web server 120 to function as a web server. The web server hosts a web site (WS) 121. WS 121 may be an access point for users to activate services made available through user and appliance registration. Wireless computing appliances may vary in functionality (e.g., different users may use different appliances having different capabilities) and interaction services may be tailored to specific customer needs and appliance capabilities. Network 101 supports one or more network servers 121 (1-n) that represent one or more third-party resources hosted on the network 101 and available for redirection or routing of a received request.

In one embodiment of the present invention, users who connect to web site 121 and log in from their wireless appliances 109 may be directed to router 114 having connection to LAN 105 in call center 104. Router 114 may be a routing server adapted to handle voice messages, text messages, video calls, voice over Internet protocol (VoIP), data requests, and other requests. Router 114 may include software (SW) 124 loaded from a non-transitory medium coupled to a processor of the router 114. SW 124 is a routing application that is capable of determining which resource to route a request to, where the resource is selected from a fixed or dynamic list of available resources. Routing requests are received from a user operating a wireless computing appliance 109, for example, where some event has triggered the generation and sending of a request.

A request may include identification of a trigger event that is now occurring or that has occurred in the proximity of or on the requesting appliance. The link established between the router 114 and the appliance 109 may include an appliance address and an appliance capability information and user authentication data. SW 124 may determine, at request processing, which resource to route the request to. A resource may be any live or automated resource connected to the network and available to the call center.

In one embodiment, a request from one of wireless computing appliances 109 (1-n) may be routed through the telephone network and local switch 106 over the telephone link to call center switch 110. An instance or a version of SW 124 may be implemented in CTI processor 111 to provide the same intelligent request routing (in this case, a call) to resources that are available to the call center and accessible to the requesting appliance 109.

SW 124 may route a request to a resource, which then presents data for display on the requesting appliance 109 if the appliance is so equipped. The request and request responses may be transparent to the user of the requesting appliance 109 and the response may be an outbound notification, call, message, display, or a combination of these depending on the media capabilities of the requesting appliance 109. In one embodiment, an available resource is an interactive voice response (IVR) unit such as IVR 123.

In one embodiment, call center 104 routes requests to internal resources in accordance with a particular business or profession and an application tailored for that business or profession. In another embodiment, call center 104 routes requests to third-party resources made available to the call center on a contractual basis. In still another embodiment, both first and third-party resources may be leveraged to handle the requests. A trigger event may be registered on one of WCAs 109 (1-n) while the appliance is not connected to router 114 without departing from the spirit and scope of the present invention. A trigger event may cause automatic connection to the router over the network. Login procedures at WS 121 may be automated through permission of the user operating an appliance having authenticating capabilities, thereby providing automatic redirection to the router 114.

A trigger event is defined in one embodiment as an event characterized by one or more event attributes that together qualify the event as a trigger event that may cause an interaction with the call center. In an example of an embodiment of the present invention, assume that appliance WCA-1 executing client software CL-1 has full voice communications and media transfer and presentation capabilities, as well as optical recognition (in a computer sense) of certain aspects of what a user is observing. For example, the appliance may configured to detect that its user has been looking at a sign (e.g., an advertisement for a mortgage service provider) for more than 5 seconds and may trigger the appliance to register the image of the sign and analyze the sign using optical character recognition (OCR), barcode (e.g., QR code), or similar technology. The trigger event is registered on the appliance and may be made at least part of a request that is automatically sent to contact center 104 (e.g., contacting the advertised mortgage service provider to connect the user with an agent of the mortgage service provider).

Software 124 at router 114 may analyze the contents of the request sent by the appliance 109 based on the trigger event and may identify a resource that is responsible for responding to the image on the sign the user was looking at. The request may then be automatically routed to the identified resource (such as one of third-party resources 122 (1-n)). The third party resource may, upon receiving the routed request, serve data, media, graphics, video, voice instruction, or other content that is displayable by the requesting appliance 109. For example, in reference to the sign viewed by the operator, the connected resource may send a message, prompt, or visual display greeting the user and asking the user if he or she would like some more information about the particular sign viewed. If so, an interactive session between the third party and the user of the requesting appliance 109 may ensue.

The locations of users operating WCAs 109 enabled to practice embodiments of the present invention may be anywhere that the WCA 109 of the user has network access. For example, users may be operating WCAs 109 within contact center 104. For example, in an internal application of an embodiment of the present invention, agents operating at workstations 118 (1-n) may be actively communicating through their conventional communications apparatuses with customers according to their daily routines provided for the purpose at each station. A roaming agent supervisor operating a WCA 109 similar to one of WCAs 109 (1-n) may walk down the workplace line adjacent to the line of workstations 118 that are staffed by agents.

As the supervisor gets within a specific distance of an active agent on a call, the supervisor's appliance 109 may register that event as a trigger event and send a notification to CTI 111 for range-based tap-in to the conversation held between the agent and a customer. In one embodiment, the supervising agent may see a text transcript of the interaction on a display. Moving to the next agent in line may reactivate the process for that next agent. In one embodiment, if the agent does not appear to be engaged in a conversation (determined optically or via data from the telephone switch 110 about the agent status of line busy or not busy), the trigger may not be created for that agent and the supervisor may bypass because the agent is not engaged in an interaction at the time of walk by. The entire process may be transparent to the agents and therefore may not disturb their ongoing efforts in the contact center in any way.

In another embodiment of the present invention, an agent working remotely or at the call center may operate a WCA 109. The WCA 109 may be configured to update the agent's availability status (available or not available) based on factors or conditions including: date and time (e.g., during or outside of the agent's work hours), the location of the agent (e.g., "unavailable" when the agent is out of the office or away from his or her desk), ambient light (e.g., "unavailable" when the agent is sleeping), movement (e.g., "unavailable" if the agent is completely still), location (e.g., "unavailable" while the agent is driving), predicted arrival time to location (e.g., "available" if the agent is within 5 minutes of the office), heart rate, temperature (e.g., "unavailable" if the agent is sick with a fever), stress levels (e.g., "unavailable" if the agent is currently feeling stressed), and status information related to the agent's location (e.g., "unavailable" if the fire alarm has been sounded at the agent's contact center), etc.

Repository 117 may store lists of resources available to call center 104 and the active/non-active statuses (or availability status) of those resources. For example, an agent may be a resource and the active/non-active status might be busy or not busy. The same basic nomenclature may be applied across a variety of types of resources both internal to and external from the call center 104.

Other status availability indicators may be available. For example, the WCA 109 may include a global positioning device (UPS) for detecting the user's location (or geo-location). A wireless networking device (e.g., WiFi or 802.11 or WLAN) device may also be used to detect nearby wireless networks to determine a location (or approximate location) of the WCA 109. The repository 117 may also be configured to store location information of the agents.

Figure 2:
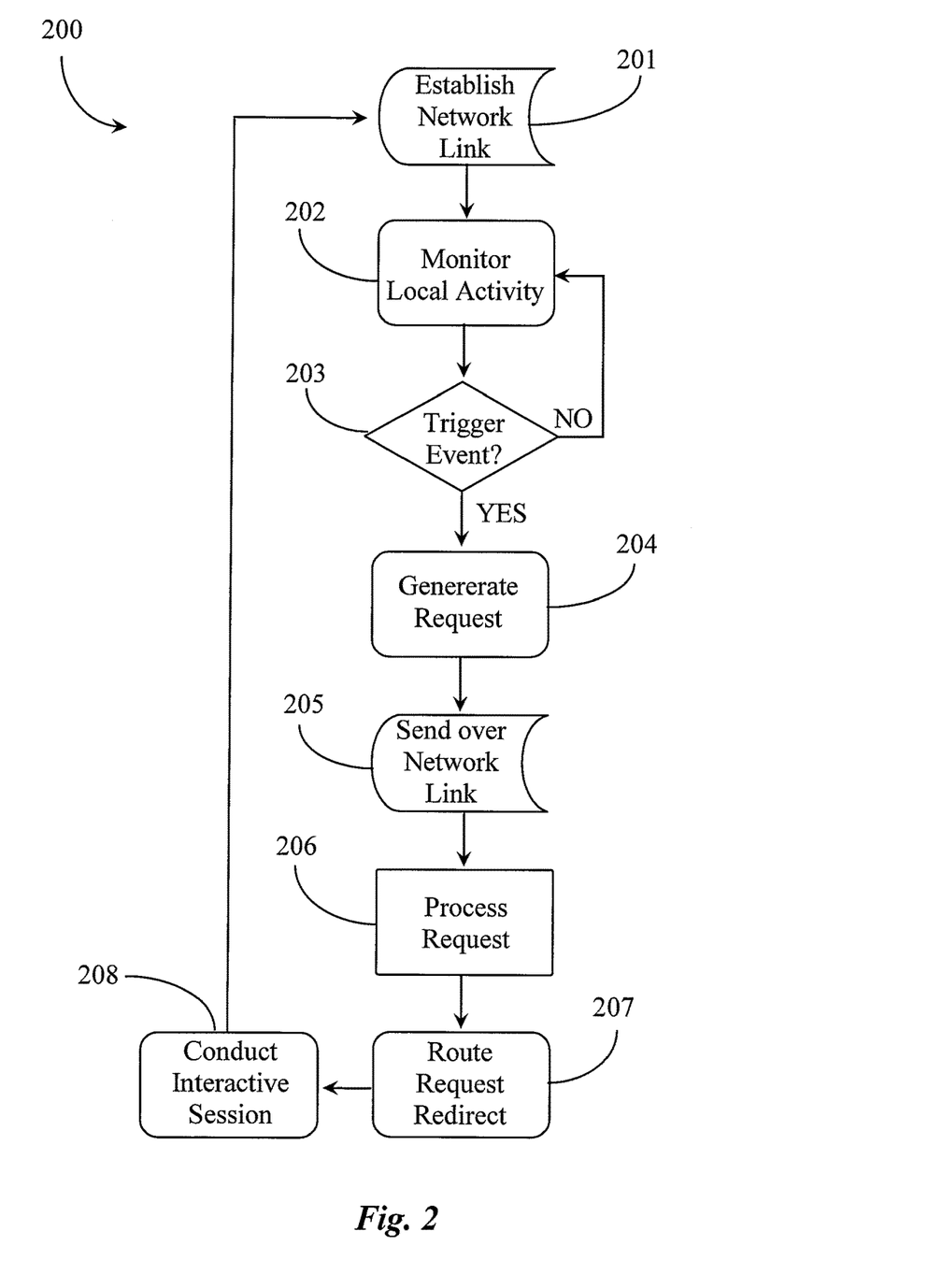
FIG. 2 is a process flow chart depicting steps for establishing an interactive session based on a trigger event according to one embodiment of the present invention.

FIG. 2 is a flow chart 200 depicting operations for establishing an interactive session based on a trigger event according to one embodiment of the present invention. In operation 201, a network link (e.g., a TCP/IP connection) may be established between a service provider such as call center 104 of FIG. 1 and a wireless computing appliance such as WCA-2 109 of FIG. 1. In this embodiment, the user or operator of the WCA 109 may not be actively transmitting data over the link. The link may be established for monitoring purposes. Embodiments of the present invention are not limited thereto, as the link may instead be established after a trigger event has occurred. For example, in some applications, a live link may be maintained due to the significant time that may be required to establish a connection (e.g., based on authentication procedures and redirect processes before a working link is established).

In operation 202, the WCA 109 monitors local activity relative to the user operating the appliance 109 and relative to any activity discernible through one or more sensing devices adapted to sense particular activities or events. Sensors may include microphones for sound, lumen sensors for sensing light, optical sensors for sensing visual stimulus, bio-sensors for sensing biological processes, motion sensors for sensing motion, and so on, as will be described in more detail with respect to FIG. 4. The type and number of sensing devices on any WCA 109 depends on the appliance capabilities and the intent of the application executing on the appliance. As operation 202 is ongoing, data collected is analyzed to determine at operation 203 if a trigger event is occurring or has occurred on or in the proximity of the WCA 109.

If no trigger event has been detected in operation 202, the process may resolve back to operation 201. If a trigger event is being or has been detected in operation 202, the WCA generates a request in operation 204 as a result, the request including the pertinent information about the specific trigger event. For example, a request triggered by a GPS sensor of the WCA 109 showing that the WCA 109 is located near a particular location may cause the request to include a latitude and longitude (e.g., may be the average latitude and longitude over the past five minutes). As another example, a request triggered by the a user's velocity may include instantaneous velocity data points for the past 10 minutes as well as average velocity over the past 2 minutes. As such, the request may include data that corresponds to the sensor data that corresponds to the detected event, where "correspondence" may include the raw sensor data and/or information computed from the raw sensor data. The request may be sent over the network link established in operation 201. In one embodiment the network link may be established any point between operation 203 and operation 205 without departing from the spirit and scope of the present invention.

In operation 205, the generated request is sent over the network to a routing entity such as router or routing server 114 of FIG. 1. The request is processed for routing in operation 206. In request processing, the trigger event data is analyzed to determine the needs of the requestor, which aids in determining what resource to route the request to. The request is routed to the appropriate resource in operation 207. The resource connection may result in a two party interactive session over the network in operation 208 (e.g., a chat session, a voice interaction, a display of a web page, a retrieval of information). The process may then resolve back to operation 201 for continued processing and routing on behalf of other WCA 109 sending requests over the network.

In one embodiment, requests may be routed to agents based on the agents' status information. For example, requests involving general technical support issues may be routed to agents who are located in relatively public places, but requests involving confidential information or more private personal information (e.g., payment methods, personal identifying information, health information, etc.) may be directed to agents who are located in private locations. As another example, requests may be routed to an agent who is near the requesting WCA 109, thereby allowing the agent to speak with the requesting user in person.

Figure 3:
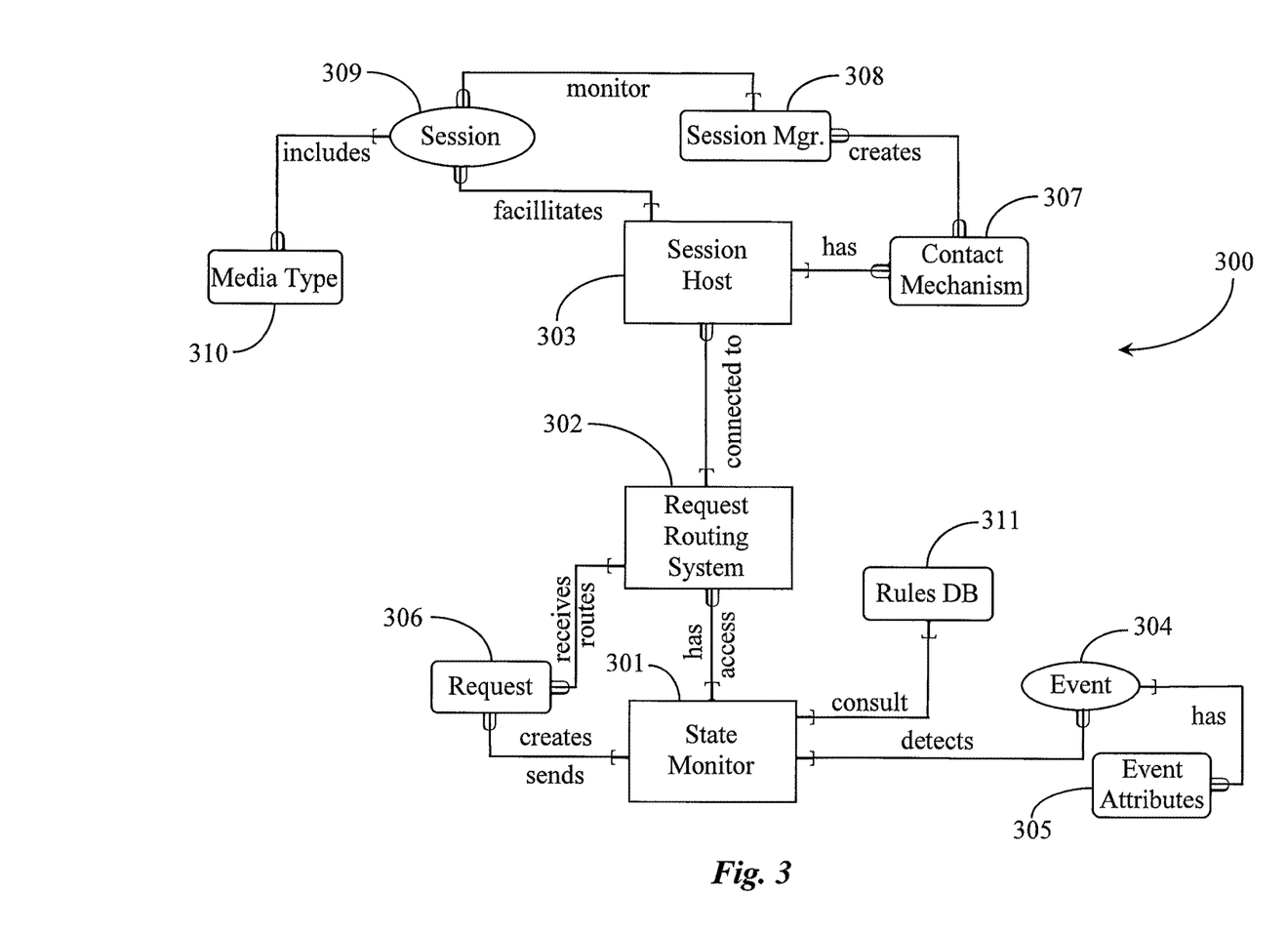
FIG. 3 is a diagram illustrating a communications management model according to one embodiment of the present invention.

FIG. 3 is a unified modeling language (UML) diagram illustrating a communications management model 300 according to one embodiment of the invention. Communications management model 300 includes a state monitor 301 representing a thin client executing instructions loaded from a non-transitory medium on a wearable computing appliance 109. State monitor 301 has access to at least one request routing system 302. In a case of many routing systems, there may be dedicated systems for routing requests of differing media types. In one embodiment, there are multiple request routing systems competing to route the request to an appropriate resource based on third party competitive bidding to provide services. In another embodiment, multiple routing points may be included in the network so that requests can be routed to a routing point based on geographic location (e.g., based on physical or network proximity of the resource relative to a WCA 109 for which a request is being processed).

State monitor 301 may detect one-to-many (or one or more) events that are occurring or that have occurred on the host WCA 109. An event 304 has event attributes 305. Event attributes 305 represent one or more conditions that might occur singly or collectively and that may be recognized by the state monitor as signifying an "event" that triggers a request to the request routing system. State monitor 301 may be customized according to the functionality or capabilities of the particular wearable computing technology that servers as its host appliance 109.

For example, an "event" occurring on or in the proximity of a WCA 109 having audio and voice recording capability might be "recognition" or detection of a pattern in the audio data, such as speech recognition of certain spoken words or sounds as an event attribute or attributes making up an event that qualifies as a trigger for an automated request. Likewise, a WCA 109 having optical recognition capabilities (e.g., a camera coupled to a processor) may recognize visual event attributes as well as audio event attributes. State monitor 301 may consult a rules database (DB) 311 containing one or more rules or constraints that govern which attribute or combination thereof qualifies an event 304. Rules database 311 may be accessed internally via accessing WCA memory or via accessing an external memory that may be coupled to the WCA 109.

Upon determining that an event is occurring or has occurred on or in proximity of a particular WCA, state monitor 301 creates and sends one-to-many (or one or more) requests 306 to request routing system 302. In one embodiment, there is one request automatically generated and sent to a single (e.g., universal) request routing system. However embodiments of the present invention are not limited thereto. For example, multiple instances of state monitors may run concurrently on a single WCA 109. In one embodiment, more than one event is registered on a WCA 109 before a request is generated and sent for routing.

Request routing system 302 receives and routes requests on behalf of WCAs 109 connected to the network. Request routing system 302 represents any media and data router capable of forwarding received requests to an appropriate resource determined as one that meets the needs of the request. An available resource may be a call center agent that receives a request and then is connected by voice channel to the WCA 109 over the network. Intelligence in routing may include matching agent skills to the needs of a request. For a medical application, a resource may be a nurse practitioner, a doctor, or some other specialist for specific conditions. For an auction, a resource may be a competitive buyer or broker.

Request routing system 302 is connected over the network to a session host 303. Session host 303 represents any platform hosting an available resource. For example, if an available resource is a live chat session with a call center agent, then the session host may be a chat server connected to the network (e.g., chat server 113). Session host 303 has at least one contact mechanism 307 representing one or more apparatuses for establishing an interactive session 309 in response to a request received from request routing system 302. In one embodiment contact mechanism 307 is an outbound call server. In another embodiment contact mechanism 307 may be a message server. In yet another embodiment contact mechanism 307 may be a media server.

Session host 303 facilitates a session 309. A session host, for example, may be a contact center communication platform in one embodiment of the present invention. Session 309 may be interactive and bi-directional and may include one or more media types 310. The exact combination of media in a multi-media session is dependent on the capabilities of the wearable computing appliance that sent the request resulting in a session. In one embodiment, a response to a request is asynchronous such as an alert or a notification with no reply settings. In one embodiment the session is a passive media session where an interactive banner advertisement or other visual presentation is made over the network to a WCA having picture display apparatus such as a display screen.

In one embodiment, the session may be created by contact mechanism 307, which may also create one-to-many (or one or more) session managers 308 to manage the session as whole or different multimedia parts of an interactive session having more than one media type 310. In the case of an alert or notification that is part of an asynchronous message chain or a unidirectional ping like a short message service (SMS) communication, no "session" as in bi-directional interactive communication session may be created and no session manager may be required. Model 300 may include components for archiving, recording, or otherwise logging activity for record keeping purposes. A session may include transactional activities such as making payments, registering for services, and/or buying products over the network.

Figure 4:
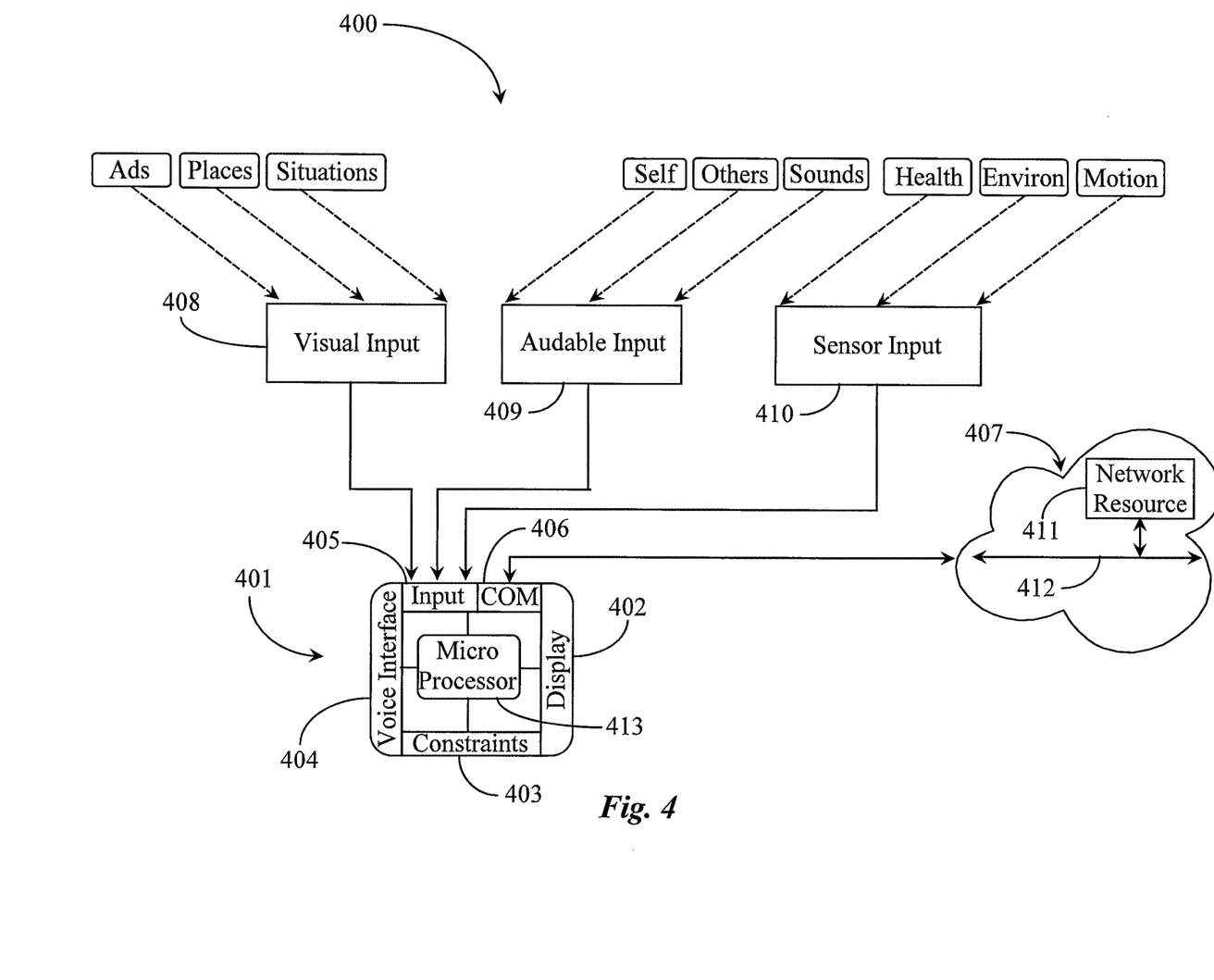
FIG. 4 a block diagram depicting a wearable computing appliance connected to a network according to one embodiment of the present invention.

FIG. 4 a block diagram depicting a wearable computing appliance 401 (e.g., appliance 109) connected to a network 400 according to one embodiment of the present invention. Appliance 401 includes a microprocessor 413 (e.g., an general purpose programmable processor such as an Intel® x86 based processor, an ARM® processor, a microcontroller, etc.) in this example, which may be powered by a self-contained rechargeable power source such as a rechargeable battery. In one embodiment appliance 401 includes an internal memory 403 containing a rules database or constraints 403 (which may correspond to or store rules database 311), which are accessible for ascertaining whether certain event attributes amount to a trigger event that may require request generation and send.

Wireless computing appliance 401 includes a display apparatus 402 in one embodiment for displaying images, documents, web pages, and so on. Display 402 may include display of interactive components such as electronic forms, contact panels, and so on. Computing appliance 401 may include a voice interface such as a telephony communications apparatus including a microphone and speaker. Appliance. 401 may include input apparatus for accepting and registering visual inputs 408 (e.g., a camera). Visual input 408 may include optically recognized inputs including ads and places that may be recognized on the appliance as the appliance operator visualizes them, such as with a pair of Google Glass for example.

Input 405 may include an apparatus for accepting and recording audio inputs 409 (e.g., a microphone). Audio inputs 409 may include voice of the operator or user, voices of others in the proximity of the operator, and ambient sounds that may be located near (or proximate) the operator. Audio input 405 may be a recording device coupled with a processor programmed with word recognition capabilities. In one embodiment, particular voices or sounds may be recognized as event attributes. For example, walking onto a subway station may result in sound recognition of a subway train and may produce some request informing another party that "I'm on the subway." This may be an automated queue to accept incoming communications from other parties. In one embodiment the detection of the subway sound triggers a request to report state for an agent coming to work that he or she is currently on the subway and therefore will be some number of minutes away from the office or late for shift.

Input 405 may be coupled to sensor input apparatuses 410 for capturing and registering input from one or more sensors that may be provided and connected to appliance 401. These may include health-monitoring sensors such as a pulse monitor, a blood pressure monitor, etc. Sensor input 410 may accept sensor input from environmental sensors such as radiation sensors, oxygen sensors, or other sensors for sampling environmental conditions within the immediate proximity of the operator. In one embodiment, input from motion sensors may be recorded and registered on the appliance. If an operator falls or crashes while riding a bicycle, for example, a request for help might be automatically triggered and sent and routed to an appropriate source like a local ambulance service close to the accident scene. In one embodiment, walking speed or jogging speed may be detected. Inputs 408, 409, and 410 may be present in whole, signally, or in combination on a single appliance 401 depending upon appliance capabilities.

Appliance 401 may include one or more communications apparatuses 406 such as a wireless communications port for accessing Internet 407 (or network 101), such as a network resource such as resource 411 connected to backbone 412. Connection to a resource may be the result of a server redirect operation, call routing of an inbound call, a call established through outbound contact, etc. In one embodiment, constraints 403 may be accessed from an external memory device coupled to appliance 401.

In some embodiments of the present invention, machine-learning may be used in analysis of status (e.g., availability status) and activity of persons with wearable devices. For example, in one circumstance an agent in a call center may use a mobile communication device in interacting with calls, so that agent might be considered to be available whether seated or standing, or moving within a particular area. Another agent may use a fixed communication apparatus that requires that she be seated at her workstation, so a status for that agent of standing or moving away from her station may be interpreted as making her unavailable for calls. In some cases, with agents equipped with wearable devices capable of recording the agent's activity and status, as well as environmental factors, the system may learn for individual agents and stations to make decisions and change status according to different status and activity for different agents.

It will be apparent to one with skill in the art that the communications management system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An apparatus comprising:
   a wearable enclosure;
   a user interface in the wearable enclosure;
   a sensor in the wearable enclosure;
   a network interface in the wearable enclosure;
   a processor in the wearable enclosure and coupled to the user interface, the sensor, and the network interface; and
   a memory in the wearable enclosure and coupled to the processor, the memory storing instructions that, when executed by the processor, cause the processor to:
      register a plurality of registered events in the memory, each of the registered events comprising one or more event attributes;
      establish a network link between a call center and the apparatus using the network interface;
      detect input data from the sensor indicative of a distance to a contact center agent engaged in communication with a customer;
      determine whether the distance satisfies one or more conditions of the one or more attributes of a registered event of the plurality of registered events;
      in response to determining that the distance satisfies the one or more conditions of the registered event, transmit a request over the network link;
      in response to the request, receive information regarding the communication between the contact center agent and the customer;
      display the information on the user interface; and
      monitor the communication between the contact center agent and the customer.

2. The apparatus of claim 1, wherein the network link is a wireless link.

3. The apparatus of claim 1, wherein the user interface comprises a voice controlled interface.

4. The apparatus of claim 1, wherein the user interface includes a display.

5. The apparatus of claim 1 wherein the sensor includes an optical recognition module.

6. The apparatus of claim 1, wherein the request comprises information corresponding to the input data associated with the event.

7. The apparatus of claim 1, wherein the sensor includes one or more bio-sensors.

8. A method comprising:
   recording, using a wearable communications appliance comprising a microprocessor, a memory, a sensor, a user interface, and a network interface, sensor data collected by the sensor, wherein the sensor data is indicative of a distance to a contact center agent engaged in communication with a customer;
   registering, using the microprocessor, a plurality of registered events in the memory, each of the registered events comprising one or more event attributes;
   establishing a network link between a node and the apparatus using the network interface;
   comparing, using the microprocessor, the distance against a plurality of conditions of the one or more event attributes of the registered events;
   in response to determining that the distance satisfies one or more conditions of the one or more attributes of a registered event of the plurality of registered events, transmit a request over the network link;
   in response to the request, receive information regarding the communication between the contact center agent and the customer;
   display the information on the user interface; and
   monitor the communication between the contact center agent and the customer.

9. The method of claim 8, wherein the network link is the Internet.

10. The method of claim 8, wherein the user interface comprises a display.

11. The method of claim 8, wherein the sensor data comprises audio activity, visual activity, location, velocity, time of activity, or environmental data.

12. The method of claim 11, wherein the audio activity is recorded via a microphone coupled to the wearable communications appliance and wherein the visual activity is recorded using a camera coupled to the wearable communications appliance.

13. The method of claim 8, wherein the request comprises data corresponding to the sensor data.

14. The method of claim 8, wherein the sensor comprises one or more biosensors.

15. The method of claim 8, wherein the sensor comprises a voice recognition module.

16. The method of claim 8 wherein the request comprises a message request.

17. The method of claim 8 wherein the request comprises a recoded voice request.

\* \* \* \* \*